Dec. 21, 1965   L. D. FURON   3,225,136
SYSTEM FOR THREE-DIMENSIONAL RECORDING
Filed Sept. 26, 1962   2 Sheets-Sheet 1

INVENTOR.
LEON D. FURON
BY
HIS ATTORNEY

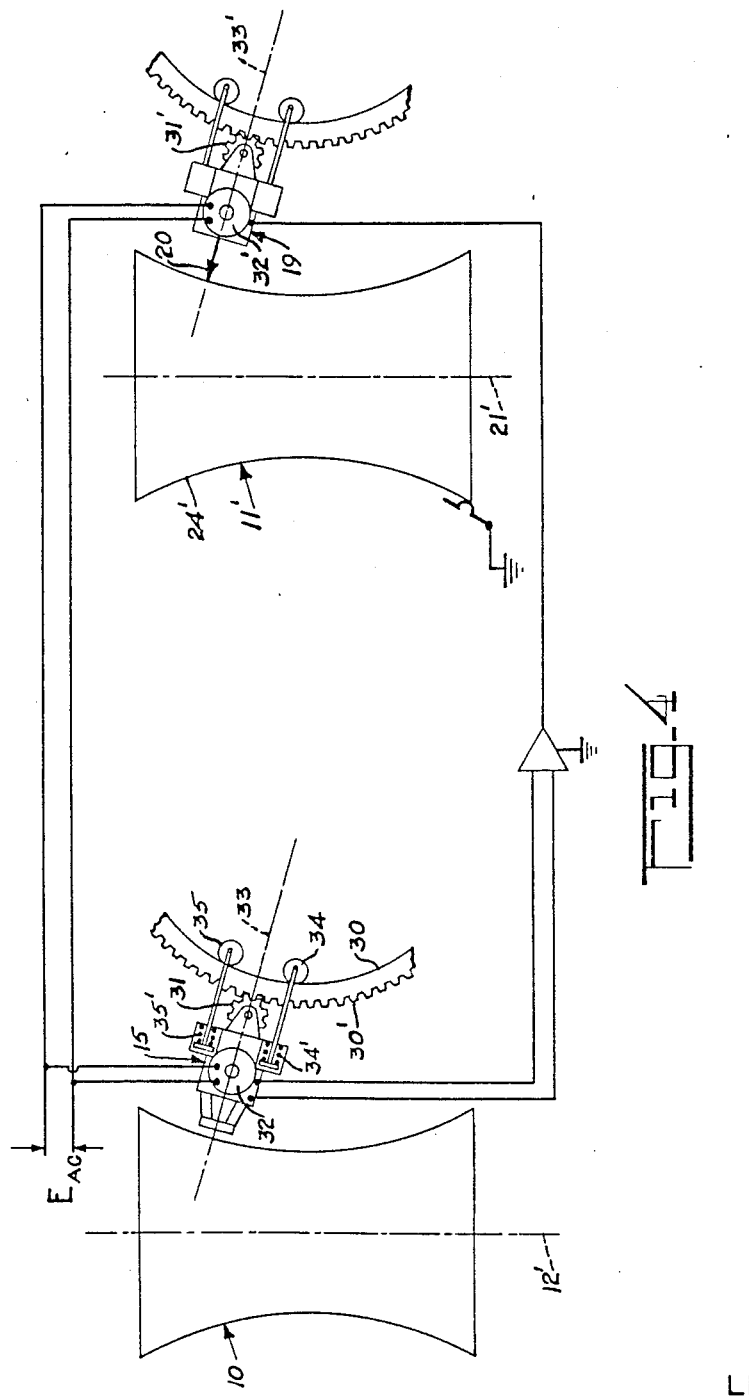

United States Patent Office 3,225,136
Patented Dec. 21, 1965

3,225,136
SYSTEM FOR THREE-DIMENSIONAL
RECORDING
Leon D. Furon, Woodland Hills, Calif., assignor, by mesne assignments, to The Budd Company, Philadelphia, Pa., a corporation of Pennsylvania
Filed Sept. 26, 1962, Ser. No. 226,219
5 Claims. (Cl. 178—6.6)

This invention relates to recording systems, and more especially to systems for recording on noncylindrical, three-dimensional record blanks.

In the field of ultrasonic testing for example, it has previously been proposed to check the continuity of structural bonds by the use of ultrasonic and facsimile techniques. A suitable system for this testing method is disclosed in U.S. Patent No. 3,036,151, granted on May 22, 1962, to Hugh A. Mitchell, Leon D. Furon, and Donald R. Modispacher, for "Ultrasonic Recording System."

In the ultrasonic testing system disclosed in the patent cited above, pulses from an ultrasonic source are applied at successive points along a planar surface to the object under test, and the reflected signals are recorded at corresponding points on a flat facsimile recording blank. Changes in reflected energy indicate changes, weaknesses or flaws within the structure under test. For best results, the method is carried out under water to enhance the propagation of the very high frequency ultrasonic sound waves.

While the foregoing technique was adequate for test objects having planar surfaces, serious problems arose in the testing of three-dimensional objects. When the reflected signals from the three-dimensional objects were applied to flat facsimile blanks, the resulting signals were difficult to interpret for defining the location of structural defects.

Accordingly, a principal object of the present invention is to provide an improved record of characteristics detected by signals transmitted through or detected near successive points on the surface of a three-dimensional object. A specific object of the present invention includes the improvement of ultrasonic testing devices for the detection and recording of structural conditions or changes in three-dimensional objects, for example, for detecting and recording the positions of sub-surface flaws.

In accordance with an illustrative embodiment of the present invention, a physical analog is constructed to have the same or a similar conformational shape as a three-dimensional object to be tested or studied. A marking coating is applied to the analog, and this coating is subjected to variable signals that are derived from signals reflected from or transmitted through corresponding points along the surface of the test object or specimen. Three-dimensional objects of conical or parabolic shape, citing specific examples, may then be tested through the use of corresponding three-dimensional conical or parabolic record blanks. Ultrasonic pulses applied to or picked up at successive points along the three-dimensional surface are applied, either electrically or mechanically, to corresponding points on the three-dimensional analog or record blank, and conditions such as flaws in the article to be tested are recorded at corresponding points on the three-dimensional record blank.

In addition to application of the invention to ultrasonic recording, the present facsimile technique is applicable generally to the recording of signals on noncylindrical, three-dimensional record members. It is particularly useful in the case of three-dimensional objects and record members having compound curvature, wherein recording sheets are not easily applied to the record member. Thus, for specific example, weather signals recorded optically from a satellite may be recorded on a generally spherical record member to provide a direct analog of global weather conditions.

Other objects, features and advantages of the present invention will become apparent from a consideration of the following detailed description and from the appended claims.

In the drawings:

FIG. 4 illustrates a further modification for continuously relating the test object and analog scanning heads respectively to normal positions with respect to the scanned contoured surfaces.

Figure 1:
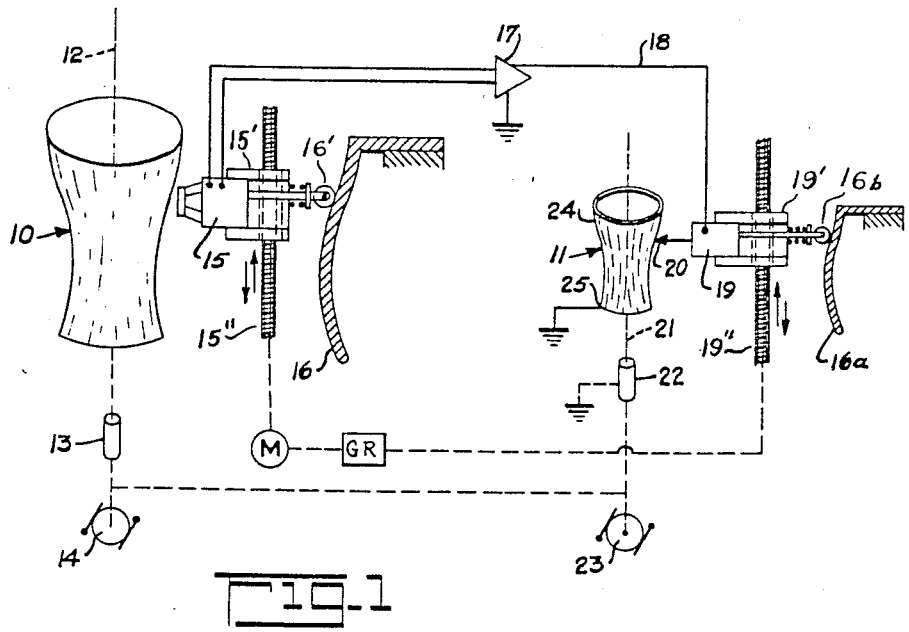
FIG. 1 shows in schematic form a typical test object and analog thereof, and the associated system for preparing the surface of the analog.
Figure 2:
FIG. 2 is a highly magnified sectional view of a portion of the analog prepared according to the invention.

In the field of ultrasonic recording and in certain other arts, it is highly desirable to make a permanent record or analog of a prototype solid article, as an example of the test object, so that the analog has the same configuration, and also represents the surface or sub-surface characteristics or other properties of the prototype as detected at successive points by suitable transducer apparatus movable over the surface of the test object. One of the more important aspects of this problem of making such an analog is the assurance that the surface of the analog has the same surface characteristics and surface variations located at the identical spots as on the prototype.

In accordance with the invention, the original test object or prototype is duplicated as to solid or configurational characteristics so that it represents a true conformational analog of the prototype. In order to impart to the analog markings corresponding to the characteristics detected at successive points on the surface of the prototype, the analog has sprayed onto its surface an electro-responsive, pressure-sensitive, abrasion-sensitive or light-sensitive coating or coatings. These coatings are then scanned in a point-by-point fashion in successive minute spots of elemental area, and in synchronism with the corresponding scanning of the corresponding elemental areas of the prototype in any manner well known in the facsimile transmission and recording arts. The scanning of the prototype produces analog currents which represent the characteristics of the prototype. These characteristics may be of any predetermined kind. For example, the surface of the test object or prototype may be scanned for light reflection properties at the various elemental areas, or for the magnetic or structural characteristics at or below such areas or even for the existence of non-uniformity of depth, smoothness or other physical characteristics of such surfaces, and the like. Similarly, the test object may be subjected to ultrasonic signals, and the signals detected by suitable transducer means movable over the surface of the object may then represent structural flaws or other conditions therein.

While the invention is not limited to the manufacture of an analog of any particular kind of test object, the drawing shows as one application of the invention a prototype of a noncylindrical object 10 whose characteristics are to be recorded in a corresponding analog 11. The analog 11 is similar in shape to the prototype 10 but may be larger or smaller, or may define a particular sub-surface portion of the prototype. Merely for explanatory purposes, it will be assumed that the prototype 10 has a symmetrical conformation of non-uniform circumference around an axis of symmetry 12 so that the prototype can be fastened to a suitable rotatable arbor 13 arranged to be driven by a constant speed motor 14, for example a synchronous motor. Mounted in scanning proximity to the surface of prototype 10 is any well-known form of scanning head 15, such as one illustrated in U.S. Patent No. 2,437,848, issued March 16, 1948, which optically scans the successive elemental areas of the surface of prototype 10 to translate the characteristics of those elemental areas into corresponding electric signals. Alternatively, the scanning head may be as shown in the above Patent No. 3,036,151, in which high frequency acoustic pulses are transmitted, received and transformed into electric signals.

It will be understood that the scanning may be done by any other well-known form of scanner, providing the scanning head includes a transducer element which is movable with the head to translate the examined characteristics of the surface of prototype 10 into corresponding electric signals. As in well-known facsimile art, the scanning head can be moved longitudinally with respect to the axis 12 in timed relation to the rotation of the prototype 10 by the motor 14 so that, in effect, the surface of prototype 10 is scanned in a helix over its entire surface. Therefore, the electric currents or signals from the head 15 at any given instant are true analogs of the examined surface or subsurface characteristics of the prototype. Since here the prototype 10 is of non-uniform circumference, it is necessary to guide the scanning head 15 so that it maintains the uniform spacing from the surface of the prototype at all successive scanned points thereof. Thus, the head 15 may be mounted for transverse guided movement in the head support 15', and uniform spacing may be maintained by means of a biased roller or rollers 16' which ride on a track 16 having a configuration corresponding to the peripheral configuration of the prototype with respect to the longitudinal axis 12. A lead-screw 15" rotatable by a constant-speed motor M may guide the head support for vertical movement parallel to the axis 12. Alternatively, the arbor 13 can be in the form of a lead-screw, and the prototype can carry a half-nut or similar threaded follower which engages the lead-screw to move the prototype along its axis 12. Thus, the prototype is indexed longitudinally of the axis 12 at the same time that it is being rotated. In that case the scanning head is relatively fixed as to vertical movement and may have attached thereto a biased roller which rides on the surface of the prototype (rather than track 16) to maintain a uniform spacing between the scanning head and the surface of the prototype.

The aforesaid analog signals are amplified by a conventional signal amplifier 17 and transmitted over electric circuitry 18 to a recording head 19 of suitable type. In lieu of amplifier 17, electronic components disclosed in Patent No. 3,036,151 may be used to convert the recorded pulses into low frequency signals for energizing the recording head 19. This head has a needle-like metal stylus 20 that is energized or operated according to the signals received by the head. A head of this type is shown in U.S. Patent No. 3,018,153, issued January 23, 1962. The head 19 and stylus 20 are mounted so as to scan in successive elemental areas the surface of the analog member 11 in manner similar to the scanning of object 10. The motors M and 14 ensure, as indicated, synchronous scanning.

The analog member 11 may be of any suitable material, such as plastic, spun aluminum or other metal, or metal alloy, it having been previously made in any well-known manner, for example by machining, molding, or the like, so as to have as above described the same conformational shape as the prototype 10. The analog body 11 may be supported on its axis of symmetry 21 by an arbor 22 driven by a synchronous motor 23, which is driven in synchronism with the motor 14 above described, or mounted on the same arbor 13 to eliminate a separate motor. The synchronous rotation of arbors 13 and 22 is indicated by the interconnecting dashed line. Here again, the scanning head 19 is moved parallel to the axis 21 at the same time that the analog member 11 is being rotated so that the stylus 20 scans the surface of the analog member 11 in successive elemental areas in synchronism with the scanning of the corresponding areas of the prototype 10. If necessary, the head 19 may be guided on a track 16a similar to track 16 so as to maintain the stylus 20 in proper contact relationship with the coated surface of analog 11.

A more precise arrangement for positioning the aforesaid scanning heads with respect to the respective test object and recording surfaces is illustrated in one operative form by FIG. 4. Here, the synchronized heads are continuously maintained in substantially normal relation respectively to the corresponding elemental areas scanned. That is, the longitudinal axis of the head is maintained perpendicular at all times to the tangent of the incremental surface in question, thereby eliminating possible error due to any material variations in the angle between the head and scanned surface.

As shown, a test object 10' is mounted for constant speed rotation about its longitudinal axis as in the case of FIG. 1. For simplicity, the area to be inspected is shown as a surface of revolution with respect to said axis. The scanning head 15 in the present instance is guided and propelled along a track 30 having a curvature or configuration corresponding as required to the aforesaid surface of revolution. The track is suitably spaced from said surface so that a normal from any point on the track to the test surface is of constant length.

To this end, the track 30 is formed as a rack having gear teeth 30' for coacting with a pinion gear 31 carried by the head 15. The pinion 31 is driven by a synchronous motor 32 also carried by the head assembly. For maintaining the head axis 33 normal to the track at all times, the head assembly is arranged to be positioned in rocking movement by the individually spring-biased rollers 34 and 35 bearing on the rear of the rack and coupled as indicated to the head assembly. As the curvature of the track changes, the springs 34' and 35' (of equal strength) are unequally biased, and as a result tend to regain balance by pivoting the head assembly in a direction so that its longitudinal axis is normal to the track. It will be seen that this axis is also normal to the test surface at 10'. The motor 32 synchronizes the rotations of the pinion 31 and the analog pinion 31'. This may conveniently be done for example, by mechanically interconnecting the pinions, as by a "Bowden" wire; or a second synchronous motor 32' on the analog head 14 may be used to drive the pinion 31', the two motors being electrically locked in synchronism.

Thus, with the test object and analog scanning heads synchronized, both as to position and axis attitude, the possibility of error due to material variations in the angle between a respective head axis and corresponding incremental scanned area is greatly reduced or minimized.

In accordance with the disclosed embodiment of the present invention, the analog member 11 is provided with an electrosensitive or electroresponsive coating 24 which has high electric conductivity, and the electric current from the energized stylus 20 can be returned to ground through a suitable brush or other contact 25 which is in engagement with the said surface. If the analog member 11 is of metal or conductive material, the ground return contact 25 may be deleted since the arbor 22 and the analog 11 would be directly grounded to the frame of the machine, as indicated by the dotted ground connection in FIG. 1. In the case of pressure-sensitive coatings, the pressure applied to the coating 24 by a corresponding head stylus is varied according to the signals from the amplifier 17, and no electrical connections to the analog are required.

I have found that in certain cases the electrosensitive coating 24 on the member 11 should have a substantial uniformity of response, even though the actual surface of the member 11 may be non-planar or irregular, and for this purpose the coating material may be applied in a spraying operation or by any other method for uniformly applying the coating. Furthermore, I have found that in order to perform this spraying operation so as to achieve the required uniformity, it is necessary to formulate a coating batch so that the final film coating 24 meets certain qualifications, namely the required electric conductivity, the required continuous film form, and the required thinness. This problem of obtaining the required uniform characteristics is particularly important where the electric conductivity of the film coating is derived from the presence of powdered carbon therein. By way of example but without limitation thereto, the film coating may be as described in U.S. Patent No. 2,554,017, granted May 22, 1951, to H. R. Dalton for "Electroresponsive Recording Blank."

In order that the surface characteristics of the coated analog can be made readily visible, the conductive coating 24 is provided with an extremely thin contrasting masking coating 26. This latter coating is of minimum thinness consistent with its ability to mask the dark or blackish hue of the conductive coating 24. The batch for the coating 24 is in the present instance comprised of a highly conductive powdered carbon black having a high coefficient of surface covering area with very small particle size in a liquid dispersing agent in the form of water. It also comprises a suitable bonding agent in a water dispersion, and also a water soluble film former and thickening agent. The carbon black, binder, etc., may for example be the same as used in coated electrosensitive papers in general use, as typified, for example, in the above Patent No. 2,554,017. As above described, the coating batch is a water solution that may be applied to the surface of the analog body 11 by any well-known form of spray gun operating under suitable pressure. The spraying operation is performed so as completely to cover the surface of member 11 without causing running of the solution. Thereupon the coated body is heated in an oven at 100 degrees C. until the liquid constituents are removed. Thereupon, the coated body is allowed to cool to room temperature before the application of the masking coating 26. A typical formulation for the masking coating 26 is that given, for example, in the above Patent No. 2,554,017, and may comprise, for example, isobutyl methacrylate in a naptha solvent and a white pigment such as zinc sulfide, zinc oxide phosphor or mixture of sulfide and oxide phosphor.

In making the batch for the masking coating 26, the batch elements are put in a pebble mill and milled for approximately forty-eight hours, making sure that before pebble milling the solution is stirred for at least twenty minutes to make sure that all the pigment is completely dispersed. This batch is applied over the coating 24 with a conventional spray gun at suitable pressure. The nozzle of the spray gun should be adjusted to a fine spray to avoid coating roughness. Preferably the coating 26 is put on in two thin layers so as to impart to the finished surface a white grayish hue. In the event that the coating 26 is applied in two layers, the first layer should first be completely dried in an oven at a temperature of 100 degrees C. and thereafter the second layer can be applied and likewise dried at 100 degrees C.

The clarity and sharpness of the recordings on the coated analog will be determined by the amount of the masking coating 26 which is applied, and the thickness of that coating can be determined by trial depending upon the darkness or contrast desired in the recorded markings. The greater the amount of coating 26, the whiter the surface finish and, therefore, the greater contrast with the exposed black conductive coating 24 at those areas where recording has been made by the recording current. Preferably the finished analog should have a white-grayish appearance for best results.

Figure 3:
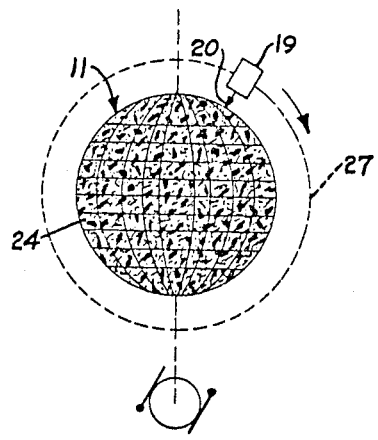
FIG. 3 represents a modified embodiment of the invention.

Referring also to FIG. 3, the invention is not limited to any particular kind of test object or any particular mechanism for scanning the object. Thus, the recording voltage which is fed to the circuitry 18, which also may represent radio transmission, may be derived from an artificial satellite revolving around the earth and carrying equipment which scans the earth to produce electric signals corresponding to some predetermined characteristic of the earth's surface or of the space around the earth. Also, the temperature, radiation level or other factors may be sensed and relayed to the earth by known telemetry techniques. Certain satellite orbits, such as polar orbits, are known to be suitable for scanning of the entire earth's surface. The analog 11 can, as indicated in FIG. 3, be a small globe or sphere having the conformation of the earth and provided with a sprayed-on recording coating as hereinabove described. If desired, the coating can be previously inscribed or otherwise marked, to correspond to known geographical or topographical markings such as latitude, longitude, and the like. Here again the globe is mounted for rotation around one of its axes as indicated, and is provided with suitable driving means to rotate it at the rate of the earth's rotation, and at the same time the recording head 19 with its recording stylus 20 is provided with suitable driving means whereby it is moved around the globe in synchronism with the movement of the satellite as related to the earth. The path of movement of the head 19 may conform to a given orbit of the satellite, and for that purpose the head 19 may be mounted for movement on a suitable guiding track indicated at 27. This head may be mounted on a small motor driven carriage (not shown) which may ride on an electrically energized track surrounding the globe 11. This track may be mounted for orientation in any desired orbit around the globe.

It is to be understood that the above-described arrangements are illustrative of the application of the principles of the invention. Numerous other arrangements may be devised by those skilled in the art without departing from the spirit and scope of the invention. Thus, by way of example and not of limitation, other known coatings and marking techniques may be employed; the scanning and marking heads 15 and 19 may have a relatively small oscillatory scanning and marking movement superimposed on the motions described above; and, in the case of ultrasonic testing, both the ultrasonic transmitter and receiver may be included in the scanning head 15, or the transducer and receiver units may be disposed on opposite sides of the material being inspected, the units being synchronously movable along the material. Accordingly, it is to be understood that the present invention is to be limited only by the spirit and scope of the appended claims.

What is claimed is:

1. A non-destructive testing system for the analog recordation of information during inspection of an irregularly shaped three dimensional workpiece, said system comprising condition sensing means including a transducer generating information signals related to the information when operatively oriented with respect to an area of the workpiece surface, first scanning means scanning the transducer over a surface of the workpiece along a defined path with respect thereto, recording means including a three dimensional analog scale model record having a recording surface geometrically similar to the workpiece surface under inspection, a recording coating on the recording surface responsive to electric transmissions therethrough generating at the positions of the transmissions visible indications of variable magnitude proportional to the magnitude of the transmissions, an output transducer responsive to the information signals generating the transmissions when operatively oriented with respect to an area of the recording coating, and a second scanning means coupled with the first scanning means scanning the output transducer over the recording coating along a path geometrically similar to the path followed by the first scanning means.

2. An ultrasonic non-destructive testing system for the analog recordation of sub-surface non-homogeneity information during inspection of an irregularly shaped three dimensional workpiece, said system comprising sub-surface condition sensing means including an ultrasonic transducer generating information signals related to the non-homogeneity information when operatively oriented with respect to an area of the workpiece surface, first scanning means scanning the transducer over a surface of the workpiece along a defined path with respect thereto, recording means including a three dimensional analog scale model record having a recording surface geometrically similar to the workpiece surface under inspection, a recording coating on the recording surface responsive to electric transmissions therethrough generating at the positions of the transmissions visible indications of variable magnitude proportional to the magnitude of the transmissions, an output transducer responsive to the information signals generating the transmissions when operatively oriented with respect to an area of the recording coating, and a second scanning means coupled with the first scanning means scanning the output transducer over the recording coating along a path geometrically similar to the path followed by the first scanning means.

3. A recording system as specified in claim 2 wherein the first scanning means is guided for movement along a major axis of said workpiece along a track bearing a predetermined spaced relation to the corresponding scanned surface of the workpiece, and said workpiece is mounted for rotation about said axis, and wherein the second scanning means is similarly guided.

4. A recording system as specified in claim 3 wherein the first scanning means is automatically positioned on said track so that the ultrasonic transducer is continuously positioned in normal relation to the scanned surface of the workpiece, and wherein the second scanning means is similarly adjustable with respect to the recording surface of the model.

5. A recording system as specified in claim 4 wherein the first and second scanning means are movable along the respective workpiece and model surfaces by motor operated, synchronously related gearing.

References Cited by the Examiner

UNITED STATES PATENTS

| | | | |
|---|---|---|---|
| 2,294,146 | 8/1942 | Wise | 204—2 |
| 2,554,017 | 5/1951 | Dalton | 204—2 |
| 2,882,525 | 4/1959 | Young | 179—100.2 |
| 2,921,126 | 1/1960 | Street | 178—6.6 |
| 3,036,151 | 5/1962 | Mitchell | 178—6.6 |

DAVID G. REDINBAUGH, *Primary Examiner.*

H. W. BRITTON, *Assistant Examiner.*